United States Patent [19]

Gellekink et al.

[11] Patent Number: 4,670,755

[45] Date of Patent: Jun. 2, 1987

[54] PULSE RADAR APPARATUS

[75] Inventors: Bernard Gellekink, Ootmarsum; Wilhelmus A. Teulings, Haaksbergen, both of Netherlands

[73] Assignee: Hollandse Signaalapparaten B.V., Hengelo, Netherlands

[21] Appl. No.: 603,055

[22] Filed: Apr. 23, 1984

[30] Foreign Application Priority Data

May 4, 1983 [NL] Netherlands .......................... 8301568

[51] Int. Cl.[4] ................................................ G01S 7/28
[52] U.S. Cl. .................................... 342/194; 342/132; 342/133
[58] Field of Search ...... 343/5 NQ, 17.1 R, 17.1 PW, 343/17.2 R, 17.2 PC, 5 FT, 5 W, 12 SB

[56] References Cited

U.S. PATENT DOCUMENTS 4,136,341  1/1979  Mulder et al. ............... 343/17.2 PC

FOREIGN PATENT DOCUMENTS 1558734   2/1969  France .
2085251   4/1982  United Kingdom .
2085252   4/1982  United Kingdom .
2088667   6/1982  United Kingdom .
2098020  11/1982  United Kingdom .

OTHER PUBLICATIONS

*IEEE Eascon '78 Record;* "Digital Multiple Beamforming Techniques for Radar", by A. Ruvin et al; (pp. 152-163; New York, 1978).

*Primary Examiner*—T. H. Tubbesing
*Assistant Examiner*—Bernarr Earl Gregory
*Attorney, Agent, or Firm*—Robert J. Kraus

[57] ABSTRACT

A pulse radar apparatus is provided with a transmitter (1), a transmitting antenna (2) and a receiving antenna system (3) with a first and a second receiving channel (4 and 5) coupled thereto. The receiving antenna system (3) comprises N stacked receiving antennas ($A_0, A_1, \ldots, A_{N-1}$). The first receiving channel (4) comprises N receiving circuits ($B_0, B_1, \ldots, B_{N-1}$), each connected to a corresponding receiving antenna ($A_0, A_1, \ldots, A_{N-1}$) and each processing the particular echo signal into two orthogonally phase-detected and digitized video signal components, and a beamformer (14) to derive from said components the orthogonal components $I_k, Q_k$ of the video signal determined jointly by the N receiving circuits in accordance with a receiving beam pattern k corresponding with a specific elevation interval. The second receiving channel (5) comprises N receivers ($B_0, B_1, \ldots, B_{N-1}$), each connected to a corresponding receiving antenna ($A_0, A_1, \ldots, A_{N-1}$); a beamformer (17) to derive from the signals of the N receivers ($B_0, B_1, \ldots, B_{N-1}$) an echo signal determined in accordance with a given receiving beam pattern; and a signal processing circuit (18) for processing said echo signal into two orthogonally phase-detected and digitized video signal components I, Q. The apparatus further comprises a video processor (16) for processing the applied $I_k, Q_k$ and I, Q signals.

4 Claims, 1 Drawing Figure

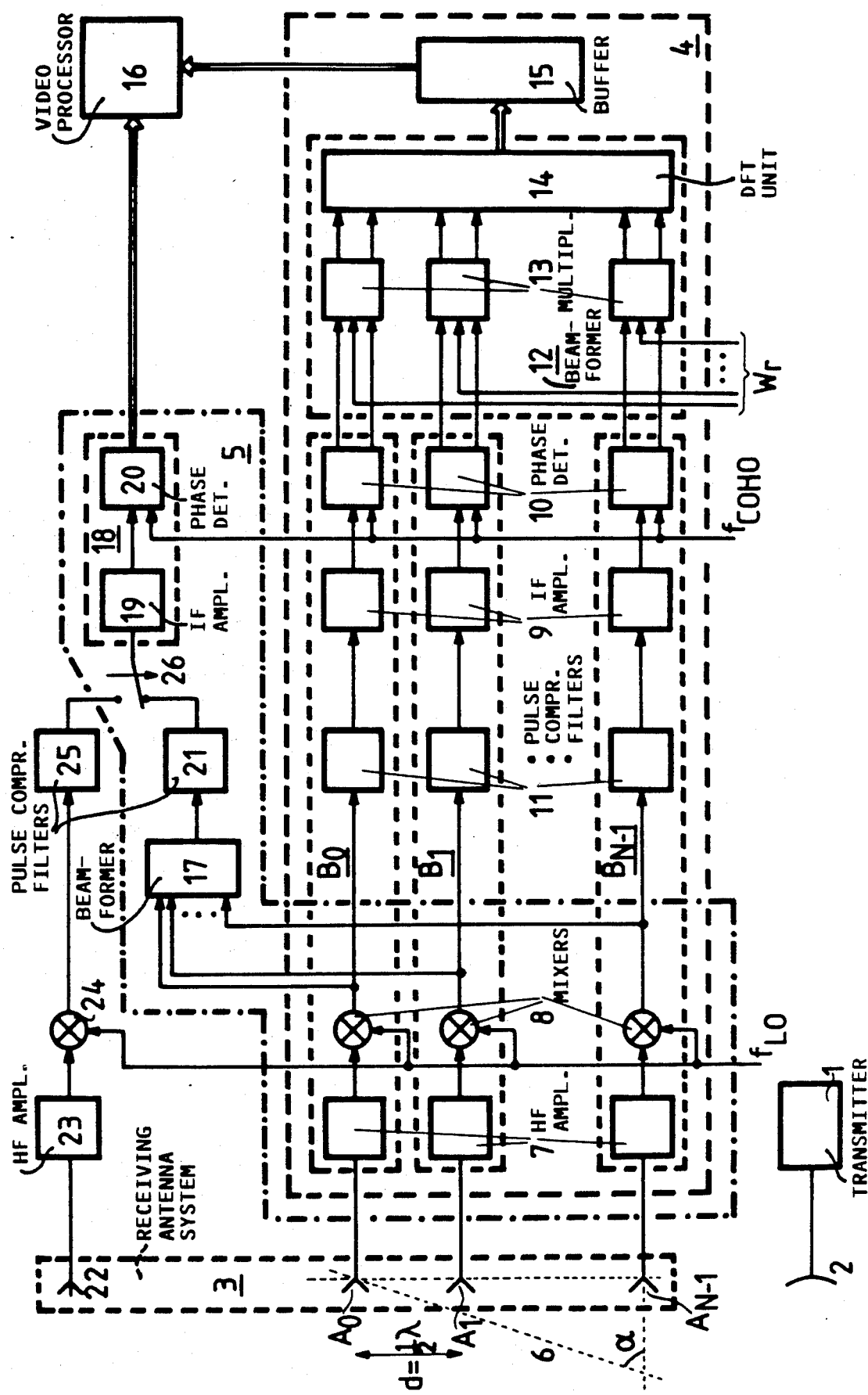

PULSE RADAR APPARATUS

BACKGROUND OF THE INVENTION

The invention relates to a pulse radar apparatus provided with a coherent transmitting and receiving unit, including a transmitter and a transmitting antenna for the transmission of radar pulses of relatively short and relatively long duration, and a receiving antenna system with a first receiving channel coupled thereto for the reception and processing of echo signals from pulses of relatively short duration, and a second receiving channel for the reception and processing of echo signals from pulses of relatively long duration.

Such a pulse radar apparatus is known in various embodiments. With all these embodiments, pulses of relatively short duration are used to determine azimuth and range of targets of short range, and pulses of relatively long duration to determine the azimuth and range of targets at long range. The present invention has for its object to provide a pulse radar apparatus, as set forth in the opening paragraph, whereby pulses of relatively short duration are employed for obtaining not only azimuth and range of targets, but also the elevation of such targets.

SUMMARY OF THE INVENTION

According to the invention, the receiving antenna system of the pulse radar apparatus comprises N stacked receiving antennas, the first receiving channel being provided with N receiving circuits, each connected to a corresponding receiving antenna and each processing the particular echo signal into two orthogonally phase-detected and digitized video signal components $i_r$ and $q_r$, where $r=0, 1, 2, \ldots, N-1$, and with a beamformer to derive from the components the orthogonal components $I_k$, $Q_k$ of the video signal determined jointly by the N receiving circuits in accordance with a receiving beam pattern k corresponding with a specific elevation interval, where $k=0, 1, 2, \ldots, N-1$, and to supply the $I_k$, $Q_k$ components via the relevant beamformer output channel K. The second receiving channel is provided with N receivers, each connected to a corresponding receiving antenna; a beamformer connected to the receivers to derive from the signals of the N receivers an echo signal determined in accordance with a given receiving beam pattern, and a signal processing circuit for processing the latter echo signal into two orthogonally phase-detected and digitized video signal components I, Q. A video processor is incorporated for processing the applied $I_k$, $Q_k$ and I, Q signals.

BRIEF DESCRIPTION OF THE DRAWING

The invention will now be explained in more detail with reference to the accompanying FIGURE, showing a schematic block diagram of a preferred embodiment of the pulse radar apparatus according to the invention.

DESCRIPTION OF THE PREFERRED EMBODIMENT

The pulse radar apparatus shown in the FIGURE comprises a coherent transmitting and receiving unit, including a transmitter 1 and transmitting antenna 2 for the transmission of radar pulses of both relatively short and long duration, a receiving antenna system 3 with a first receiving channel 4, coupled thereto, for the reception and processing of echo signals from pulses of relatively short duration, and a second receiving channel 5 for the reception and processing of echo signals from pulses of relatively long duration. As will be seen from the FIGURE and explained hereinafter, the receiving channels 4 and 5 in the preferred embodiment have a common channel part. The receiving antenna system 3 comprises N stacked receiving antennas $A_0, A_1, \ldots, A_{N-1}$. The first channel includes N receiving circuits $B_0, B_1, \ldots, B_{N-1}$, each connected to a corresponding receiving antenna and each processing a respective echo signal into two orthogonally phase-detected and digitised video signal components $i_r$ and $q_r$, where $r=0, 1, \ldots, N-1$. If the transmitter pulse of relatively short duration be represented by $F(t) \cdot e^{2\pi j f_o t}$, where $f_o$ is the transmitter frequency and $F(t)$ the envelope of the transmitter pulse, the echo signal received through antenna $A_r$ may be expressed by:

$$G(t) \cdot e^{2\pi j[(f_o + f_d)t + \phi + f_o \cdot \frac{rd\cos\alpha}{c}]} \quad (1)$$

where $G(t)$ is the envelope of the echo signal, $f_d$ the Doppler frequency, d the mutual distance of the receiving antennas, $\alpha$ the elevation angle of the target wavefront 6 incident on the receiving antennas, c the velocity of light, and $\phi$ a phase angle dependent on the target range. With $c = \lambda \cdot f_o$ and $d = \frac{1}{2}\lambda$, the echo signal, transformed in receiving circuit $B_r$ to the intermediate frequency and coherently phase-detected, can be represented by:

$$G(t) \cdot e^{2\pi j(f_d t + \frac{1}{2}r\cos\alpha)}; \quad (2)$$

in this signal $i_r$ and $q_r$ are the orthogonal components.

To obtain such a signal, each of the receiving circuits $B_r$ consists of a high-frequency amplifier 7, a mixer 8 for transforming the frequency of the echo signals to the intermediate frequency $f_{IF} + f_d = f_o + f_d - f_{LO}$, an i.f. amplifier 9, and a phase detector 10 for the coherent phase detection and digitizing of the obtained i.f. signals into the orthogonal components $i_r$ and $q_r$. The phase detection is performed with a detection signal transformed to the i.f. frequency $f_{COHO}$ and synchronized in phase with the transmitter frequency. Another method to obtain the $i_r$ and $q_r$ components is described in the Dutch patent application No. 82 04935 (corresponding to U.S. patent application Ser. No. 549,943 filed Nov. 9, 1983), where the i.f. signals are phase-detected at a frequency shifted over a value $f_c$ with respect to the intermediate frequency, while the then obtained signals are digitized at a frequency of about $4f_c$. The digitized signals are supplied alternately to a first and a second accumulator during a certain period; after this period, the output signals of these accumulators represent the orthogonally detected components $i_r$ and $q_r$. To enlarge the range of the transmitter pulses of relatively short duration, these pulses are frequency-modulated in transmitter 1. Each of the receiving circuits $B_r$ comprises a pulse compression filter 11, matched to the specific modulation of the transmitter pulses of relatively short duration. In principle, the pulse compression filter can be inserted either before or after the i.f. amplifier; in practice, this will depend on the STC controls applied. The $i_r$ and $q_r$ values are supplied to a beamformer 12, where they may be multiplied by a weighting factor $W_r$. For this purpose, a multiplier 13 is incorporated for each value of r. The weighting factors form a vertically varying weighting function suitable to effect sidelobe suppression. Beamformer 12 further comprises a DFT unit 14, applicable as an FFT unit, especially if $N=2^m$, where m is a positive integer. Unit 14 and therewith the beamformer 12 supply, through output channel k, where $k=0, 1, \ldots, N-1$, the $I_k$ and $Q_k$ orthogonal components of the video signal determined jointly by the N receivers, which video signal is proportional to $$G(t) \cdot e^{2\pi j f_d t} \cdot \sum_{r=0}^{N-1} W_r e^{\pi j r(\cos\alpha - \frac{2k}{N})} \quad (3)$$

With the application of a weighting function varying symmetrically with respect to the antenna main direction, where $W_r = W_{N-1-r}$ for $r = 0, 1, 2, \ldots, \frac{1}{2}N-1$, this expression can be reduced to $$G(t) \cdot e^{2\pi j f_d t} \cdot A(\alpha,k) \cdot e^{\frac{N-1}{2}\pi j(\cos\alpha - \frac{2k}{N})} \quad (4)$$

where $A(\alpha,k)$ represents the real quantity determined by the radiation incident angle $\alpha$, the number k of the relevant beamformer output channel and the applied weighting function. Thus, each output channel k passes $I_k$ and $Q_k$ components of a video signal derived jointly by the N receivers from the $i_r$ and $q_r$ components of the detected and digitized video signals in accordance with a specific receiving beam pattern k. Each receiving beam pattern corresponds with a specific elevation interval. The main directions of the different receiving beam patterns are determined by the relationship $\cos\alpha - [(2k)/N] = 0$. The $I_k$ and $Q_k$ components are supplied to a video processer 16 via a multiplexing and buffering circuit 15.

The second receiving channel 5 comprises N receivers, each connected to a corresponding receiving antenna. In the embodiment shown in the FIGURE, each of these receivers consists of a high frequency amplifier 7, forming part of a corresponding receiving circuit of the first receiving channel 4, and a mixer 8. The second receiving channel further comprises a beamformer 17 operable at an intermediate frequency ($f_{IF}$). The input signals of beamformer 17 can be expressed by $$G(t) \cdot e^{2\pi j[(f_{IF}+f_d)t+\phi+\frac{1}{2}r\cos\alpha]} \quad (5)$$

The beamformer output signal may then be expressed by:

$$\sum_{r=0}^{N-1} G(t-\tau_r) e^{2\pi j[(f_{IF}+f_d)(t-\tau_r)+\phi+\frac{1}{2}r\cos\alpha]} \quad (6)$$

where $\tau_r$ is the delay time to which the i.f. signal from the receiver r is subjected in the beamformer. If the echo signal is of a sufficiently long duration, it can be assumed that $G(t-\tau_r) = G(t)$ for $r=0, 1, \ldots, N-1$, and if $\tau_r = r \cdot \Delta\tau$, the beamformer output signal can be represented by $$G(t) \cdot e^{2\pi j[(f_{IF}+f_d)t+\phi]} \cdot \sum_{r=0}^{N-1} e^{j\pi r(\cos\alpha - q)} \quad (7)$$

where $q = 2f_{IF}\cdot\Delta\tau$ and $2f_d\cdot\Delta\tau < < q$. To avoid long delay times, the delays contributed by $e^{\frac{1}{2}jn\pi}$ can be replaced by $\frac{1}{2}n\pi$ phase shifting networks. The second receiving channel 5 also comprises a signal processing circuit 18, consisting of an i.f. amplifier 19 and a phase detector 20 for the coherent phase detection and digitizing of the output signal of beamformer 17 into two orthogonal components I and Q. The phase-detected video signal can now be expressed by:

$$G(t) \cdot e^{2\pi j f_d t} \cdot \sum_{r=0}^{N-1} e^{j\pi r(\cos\alpha - q)} \quad (8)$$

The main direction of this signal is determined by the equation $\cos\alpha - q = 0$ and is therefore dependent on the selection of $\Delta\tau$, i.e. on the dimensioning of the beamformer 17. Since receiving channel 5 serves for the processing of echo signals from pulses of relatively long duration and functions as a long-range channel, it is sufficient that—unlike the beamformer 12 in receiving channel 4—echo signals are established in one receiving beam pattern oriented in a low elevation. The sidelobe level of beamformer 4 is therefore of less concern than that of beamformer 12. A weighting function with the associated signal-to-noise ratio of inferior quality can therefore be omitted. To be able to further enlarge the range of transmitted pulses of relatively long duration, these pulses are frequency-modulated in transmitter 1. The second receiving channel 5 comprises a pulse compression filter 21, matched to the specific modulation of the transmitter pulses of relatively long duration. Also in this case, the compression filter may be inserted either before or after the i.f. amplifier 19.

In a preferred embodiment, the pulses of relatively short and long duration have the same carrier frequency or, if they are frequency-modulated, the same center frequency. This however implies that the two types of echo signals must be separated on a time basis instead of on a frequency basis. The simplest method to realize such a separation is to designate a certain azimuth sector for the transmission of relatively long duration pulses and another azimuth sector for the transmission of relatively short duration pulses. Another possibility is the transmission of relatively long duration pulses in one antenna revolution and that of relatively short duration pulses in one or several subsequent antenna revolutions.

The pulse radar apparatus also comprises an omnidirectional antenna 22, forming part of the receiving antenna system 3, with a receiver connected thereto and consisting of a high frequency amplifier 23 and a mixer 24. The purpose of the omnidirectional antenna, the connected receiver, and the signal processing circuit referred to hereinafter, is to obtain a sidelobe suppression in azimuth for the receiving beam patterns of the first receiving channel 4. This signal processing circuit is thereto substantially identical to the signal processing means in each receiving circuit $B_r$ of the first receiving channel 4. For this reason the i.f. signals from mixer 24 are fed to an i.f. amplifier and a phase detector, which are identical to i.f. amplifier 9 and phase detector 10 in each of the receiving circuits $B_r$ of the first receiving channel 4. In the event the frequency of the two types of pulses is equal, or in the event the center frequency of the two types of pulses is equal if these are at least frequency modulated, the i.f. amplifier 19 and phase detector 20 can be used for the omnidirectional antenna receiving channel; in the event the relatively short duration pulses are frequency-modulated, a pulse compression filter 25, identical to compression filter 11 in receiver circuit $B_r$ of the first receiving channel 4, must be incorporated in the omnidirectional antenna receiving channel. Since in such a case the omnidirectional antenna receiving channel and the second receiving channel 5 are partially identical, switching means 26 should be incorporated; such switching means must be set manually to the position shown in the FIGURE, for the transmission of relatively long duration pulses and to the other position for the transmission of relatively short duration pulses.

The I and Q signals of the phase detector 20 are, like the $I_k$ and $Q_k$ signals, supplied to video processor 16. The operations performed in this processor are: the determination of the log modulus values from these orthogonal components, the sidelobe suppression, Doppler processing if desired, formation of plots of the video signals obtained, etc. These processes are however of no concern to the present invention.

We claim:

1. A pulse radar apparatus comprising a coherent transmitting and receiving unit having a transmitting part including a transmitter and a transmitting antenna for the transmission of radar pulses of relatively short duration and frequency-modulated radar pulses of relatively long duration, and having a receiving part including a receiving system comprising N stacked receiving antennas, a first receiving channel having N receiving circuits electrically connected to respective ones of the receiving antennas for receiving, detecting and processing echo signals from the pulses of relatively short duration, and a second receiving channel having N receivers electrically connected to respective ones of the N receiving antennas for receiving and detecting echo signals from the pulses of relatively long duration, each receiving circuit of the first receiving channel including means for processing the respective echo signal into two orthogonally-phase-detected and digitized video signal components $i_r$ and $q_r$, where $r = 0, 1, 2, \ldots, N-1$; characterized in that:

(a) the first receiving channel further comprises a first beamformer, electrically connected to the N receiving circuits for deriving from said components the orthogonal components $I_k$, $Q_k$ of the video signal determined jointly by the N receiving circuits in accordance with a receiving beam pattern k corresponding with a specific elevational interval, where $k = 0, 1, 2, \ldots, N-1$, and for supplying each $I_k$, $Q_k$ component via a respective beamformer output channel k;

(b) the second receiving channel further comprises a second beamformer electrically connected to the N receivers for deriving from the detected signals an echo signal determined in accordance with a given receiving beam pattern, a pulse compression filter electrically connected to the second beamformer, and a signal processing circuit electrically connected by means of the pulse compression filter to the second beamformer for processing the respective echo signal into two orthogonally phase-detected and digitized video signal components I, Q; and (c) a video processor is electrically connected to the first and second receiving channels for processing the $I_k$, $Q_k$ and I, Q signals.

2. A pulse radar apparatus comprising a coherent transmitting and receiving unit having a transmitting part including a transmitter and a transmitting antenna for the transmission of radar pulses of relatively short duration and relatively long duration, both types of radar pulses having the sme center frequency, and having a receiving part including a receiving system comprising N stacked receiving antennas, a first receiving channel having N receiving circuits electrically connected to respective ones of the receiving antennas for receiving, detecting and processing echo signals from the pulses of relatively short duration, and a second receiving channel having N receivers electrically connected to respective ones of the N receiving antennas for receiving and detecting echo signals from the pulses of relatively long duration, each receiving circuit of the first receiving channel including means for processing each respective echo signal into two orthogonally-phase-detected and digitized video signal components $i_r$ and $q_r$, where $r = 0, 1, 2, \ldots, N-1$; characterized in that:

(a) the transmitter is adapted for selective transmission of the two types of radar pulses on a time-sharing basis;

(b) the first receiving channel further comprises a first beamformer electrically connected to the N receiving circuits for deriving from said components the orthogonal components $I_k$, $Q_k$ of the video signal determined jointly by the N receiving circuits in accordance with a receiving beam pattern k corresponding with a specific elevation interval, where $k = 0, 1, 2, \ldots, N-1$, and for supplying each $I_k$, $Q_k$ component via a respective beamformer output channel k;

(c) the second receiving channel further comprises a second beamformer electrically connected to the N receivers for deriving from the detected signals an echo signal determined in accordance with a given receiving beam pattern, and a signal processing circuit for processing the echo signal into two orthogonally phase-detected and digitized video signal components, I, Q; and (d) a video processor is electrically connected to the first and second receiving channels for processing the $I_k$, $Q_k$, and I, Q signals.

3. A pulse radar apparatus as in claim 2, characterized in that the receiving system comprises an omnidirectional antenna having a receiver connected thereto, and switching means for supplying the output signal of said receiver to the signal processing circuit during the pulse repetition periods of the radar pulses of relatively short duration, and for supplying the signal from the beamformer of the second receiving channel to said signal processing circuit during the remaining pulse repetition periods.

4. A pulse radar apparatus as in claim 3, wherein the transmitter is adapted for frequency-modulating the two types of radar pulses, and each receiving circuit of the first receiving channel comprises a pulse compression filter, characterized in that a pulse compression filter for pulses of short duration is incorporated between the receiver connected to the omnidirectional antenna and the switching means.

* * * * *